United States Patent [19]

Manzoni

[11] Patent Number: 4,523,736
[45] Date of Patent: Jun. 18, 1985

[54] DEVICE FOR MOUNTING A REARVIEW MIRROR CASING ON A SUPPORT MEMBER

[75] Inventor: Stéphane Manzoni, Saint-Claude, France

[73] Assignee: Societe Manzoni-Bouchot, Saint-Claude, France

[21] Appl. No.: 354,106

[22] Filed: Mar. 2, 1982

[51] Int. Cl.³ .............................................. B60R 1/02
[52] U.S. Cl. ..................... 248/483; 16/281; 74/501 M; 350/635
[58] Field of Search ............ 248/483, 487; 74/501 M, 74/97; 350/307; 16/281

[56] References Cited

U.S. PATENT DOCUMENTS

| | | | |
|---|---|---|---|
| 1,573,311 | 2/1926 | French et al. | 16/281 |
| 2,117,148 | 5/1938 | Clark | 16/281 |
| 2,505,467 | 4/1950 | Eilert | 16/281 X |
| 2,602,684 | 7/1952 | Pinke | 16/281 X |
| 3,005,383 | 10/1961 | Pierson | 350/307 |
| 4,357,076 | 11/1982 | Manzoni | 248/487 |

FOREIGN PATENT DOCUMENTS

| | | |
|---|---|---|
| 2838465 | 3/1980 | Fed. Rep. of Germany . |
| 2405843 | 10/1977 | France . |
| 2443349 | 4/1980 | France . |
| 2040242 | 8/1980 | United Kingdom ............ 248/487 |
| 2071035 | 9/1981 | United Kingdom ............ 350/307 |

*Primary Examiner*—J. Franklin Foss
*Assistant Examiner*—David L. Talbott
*Attorney, Agent, or Firm*—Remy J. VanOphem

[57] ABSTRACT

A device for mounting a rearview mirror casing on a support member integral with the bodywork of a vehicle, wherein the casing has a convex face against concave face of the support member by an elastic member disposed inside the casing.

One of the ends of the elastic member is secured inside the casing. The other end is pivoting mounted on a fastening member integral with the support member and extending inside the casing so that the action of the spring is always exerted along the longitudinal axis of the casing. The convex face of the casing is provided with an opening to allow the fastening member therethrough. The opening has at least two opposing bosses which are adapted to be selectively engaged in at least two opposing slots extending from the opening when the casing is in a retracted position. The housing has at least one rib which is engaged in a corresponding slot provided in the support member.

20 Claims, 5 Drawing Figures

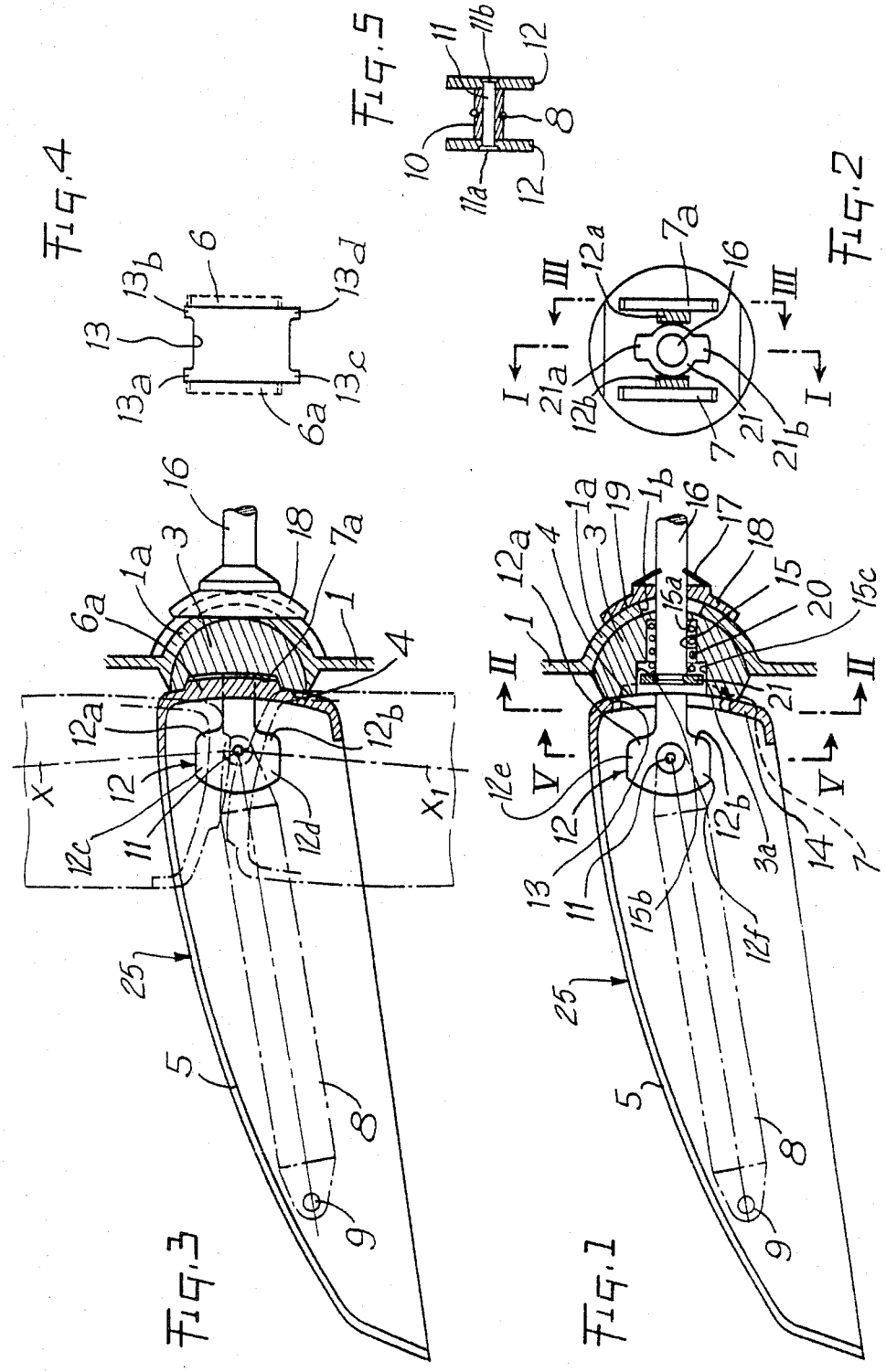

DEVICE FOR MOUNTING A REARVIEW MIRROR CASING ON A SUPPORT MEMBER

BACKGROUND OF THE INVENTION

The present invention relates to a device for mounting a rearview mirror casing on a support member integral with the bodywork of a vehicle, for example, the gusset of a vehicle door.

The rearview mirror which is adjustable from inside the vehicle often consists of a mirror secured to the casing and forming an integral part therewith.

It is known to use connection means between the casing and the control support member, which generally consists of a resilient member using a draw spring or compression spring placed inside the casing. The spring is secured at one of its ends inside the casing and at its other end on the control support member.

SUMMARY OF THE PRESENT INVENTION

The device according to the present invention also uses a spring, but the spring is secured to the control member in a different location than in previous rearview. The spring is provided in a functional opening in the wall of the casing which is in contact with the support member.

According to the present invention, one of the ends of the spring is secured inside of the casing and the other end is mounted for pivoting on a fastening member integral with the support member and extending inside the casing so that the action of the spring is always exerted along the longitudinal axis of the casing. The convex face of the casing provided with an opening to allow the fastening member to pass there through, which opening includes at least two opposing bosses which are adapted to be selectively engaged in at least two slots, provided at the ends of the opening, when the casing is in a retracted position. The housing has at least one rib which is engaged in a corresponding slot provided in the support member.

The primary object of the present invention is to provide an elastic connection and retraction system for the casing relative to the supporting member, with which it forms a predetermined angle. The connection and retraction system permits to the casing remain in an outermost retracted position without an automatic elastic return.

The above described arrangement is safe in the event of an impact on the casing, since the latter is not urged by its return spring and is not roughly returned to its initial position, thereby preventing "backlashing".

The device according to the present invention further permits, when the vehicle is being delivered, maintaining the cup-shaped casing member in a position against the bodywork to avoid damage thereto.

BRIEF DESCRIPTION OF THE DRAWING

The present invention will be more readily understood on reading the following description, with reference to the accompanying drawings in which:

FIG. 1 is a plan view of a cross-section taken along line I—I of FIG. 2 of an example of structure of a rearview mirror according to the present invention;

FIG. 2 is a cross-sectional view along line II—II of FIG. 1;

FIG. 3 is a plan view of a cross-section taken along line III—III of FIG. 2;

FIG. 4 is a view showing the inner face of the casing in contact with the swivel joint; and FIG. 5 is a cross-sectional view taken along line V—V of FIG. 1.

DETAILED DESCRIPTION OF THE PREFERRED EMBODIMENT

FIGS. 1, 2 and 3 show a vehicle rearview mirror assembly 25 which includes a supporting member 1 presenting a spherical housing 1a inside of which is pivotally mounted a swivel member 3. The swivel member 3 presents a concave face 3a against which rests a convex face 4 of a wall 14 of a casing 5. A mirror, not shown in the drawing, is mounted in conventional manner to the casing 5.

Moreover, the convex face 4 of the casing 5 is provided with two ribs 6, and 6a which are respectively engaged in parallel housings 7, slots 7 and 7a of substantially horizontal axis, provided in the swivel member 3. The casing 5 is held in contact with the concave face 3a of the swivel member 3 by the action of a helical draw sprng 8 situated inside of the casing and extends generally along the longitudinal axis thereof. The helical draw spring 8 is secured at one of its ends 9 to an interior portion of the casing, and at the other of its ends on a cross-piece 10, best shown in FIG. 5. The cross piece 10 is held between the branches 12a and 12b of a fork member 12 which is secured to the swivel member 3 by any appropriate means, by a spindle 11. The two ends 11a and 11b of the spindle 11 are riveted, respectively, to the branches 12a and 12b of the fork member 12.

The fork member 12 extends inside the casing 5 through an opening 13 best shown in FIG. 4, provided in the wall 14 in contact with the swivel. The opening 13 is provided at each end with lots 13a, 13b and 13c, 13d into which the bosses 12 and 12d of the fork 12 and the bosses 12e and 12f of the branch 12b of the fork 12 are adapted to engage, when the casing 5 is in a retracted position, as shown in broken line in FIG. 3.

In either of the retracted positions the spring 8 is pivoted about the spindle 11 and acts on the casing 5 in the direction X or X₁. The spring thereby keeps the casing 5 in the retacted position and prevents its automatic return to the initial position. To return the casing 5 to the normal position, shown in solid line in FIGS. 1 and 3 a manual action is necessary to release the casing from the bosses 12c, 12d, 12e, and 12f of the fork member 12. The spring 8 rotates on the cross-member 10 bringing the ribs 6 and 6a inside the slots 7 and 7a of the swivel member 3.

The swivel member 3 is provided with a recess 15 inside of which is slidably mounted an operating lever 16. The operating lever 16 extends inside the vehicle through an oblong orifice 1b in the supporting member 1. A cup-shaped member 18 with a concave bearing surface is provided between a stop washer 17 provided on the operating lever, 16 and a convex external bearing surface 19 of the spherical housing 1a of the supporting member 1. The cup-shaped member 18 is biased against the surface 19 by the action of a helical compression spring 20.

The compression spring 20 is placed inside the recess 15 of the swivel member 3 and is in resting contact on of its sides on an annular surface 15a of the recess 15. On the other of its sides. The compression spring 20 rests on a washer 21 formed integrally with the operating lever 16. The washer 21 is provided with two fingers 21a and 21b engaged in two corresponding recesses 15b and 15c of the swivel member 3.

In this way, the operating lever 16 is made integral with the swivel member 3, via the fingers 21a and 21b and via the spring 20. The permits rapid orientation of the swivel member 3 and the casing 5, in all of the positions by the application of a pedetermined operating torque.

The device described hereinabove can also be used for the rearview mirrors of commercial vehicles (such as vans and trucks).

In this case, the casing 5 is mounted in a conventional manner, by way of a swivel joint, on the end of an intermediate support arm. The intermediate support arm longitudinally carries the draw spring 8 which provides a means for resiliently connecting the curvilinear end of the intermediate support arm on the corresponding curvilinear part of the support member secured to the vehicle bodywork. A clawing member is provided on the support member.

In the event of an impact, the intermediate support arm is released from its locking means and, thereafter, remains free of any elastic pressure to the end of the retracting stroke. This particular arrangement enables the driver to fold down the rearview mirror in tight passages.

The present invention is in no way limited to the details of the description given hereinabove and, on the contrary, the claims appended hereto are intermediate cover any modifications that can be made thereto without departing from the scope thereof.

What is claimed is:

1. A rearview mirror assembly for a vehicle, said rearview assembly comprising:
    a casing having a longitudinal axis and an interior cavity;
    a convex face on said casing extending generally transversely relative to said longitudinal axis;
    support means adapted for rigid interconnection with said vehicle;
    a concave face on said support means selectively engageable with said convex face of said casing;
    first mechanical engaging means on said convex face;
    second mechanical engaging means on said concave face and selctively engageable with said first mechanical engaging means in a first predetermined angular position of said casing relative to said support means to inhibit relative rotation therebetween, said longitudinal axis generally extending away from said vehicle in said first predetermined angular position;
    an opening in said convex face;
    a fastening member fixedly interconnected with said support means and extending therefrom through said opening in said convex face into said interior cavity of said casing; and
    first biasing means disposed within said interior of said casing and mechanically interposed said casing and said fastening member, said first biasing means having a first end interconnected with said fastening member and a second end extending generally along said longitudinal axis therefrom and interconnected with a portion of said casing remote from said fastening member such that said first biasing means exerts a force generally along said longitudinal axis of said casing and further such that said first biasing means biases said first and second mechanical engaging means into engagement in said first predetermined angular position such as to inhibit rotation therefrom but permit rotation therefrom in response to the application of a torque on said casing in excess of a predetermined torque level.

2. The rearview mirror assembly of claim 1 wherein said first mechanical engaging means comprises at least one rib extending from said convex face and wherein said second mechanical engaging means comprises a slot in said concave face, said at least one rib being selectively engageable in said slot.

3. The rearview mirror assembly of claim 1 wherein said fastening member comprises a fork member having a first branch, a second branch, and a cross-piece extending therebetween, said first end of said first biasing means being interconnected with said cross-piece.

4. The rearview mirror assembly of claim 1 further comprising:
    at least two opposing bosses extending from said fastening member in a direction generally transverse to said longitudinal axis; and
    at least two slots extending from said opening and cooperating with said at least too opposing bosses when said casing is rotated from said first predetermined angular position in at least one angular direction therefrom.

5. The rearview mirror assembly of claim 1 wherein said casing is pivotable in both angular directions from said first predetermined angular direction relative to said support means to second and third predetermined angular positions wherein said longitudinal axis is approximately parallel to said vehicle.

6. The rearview mirror assembly of claim 1 wherein said support means comprises:
    a support member adapted for interconnection with said vehicle;
    a partial spherical cavity inside of said support member;
    a swivel member partially pivotally fitted in said partial spherical cavity, said concave face being formed on said swivel member and said fastening member being interconnected with said swivel member; and
    fastening means rotatably and movably interconnecting said swivel member with said support member such as to permit adjustment of said rearview mirror assembly relative to said vehicle.

7. The rearview mirror assembly of claim 6 wherein said support means further comprises:
    a bore in said swivel member;
    a counterbore partially through said swivel member coaxial with said bore;
    a shoulder formed between said counterbore and said bore;
    an aperture in said support member and aligned with said bore;
    first abutment means on said fastening means and disposed adjacent said support member;
    an intermediate portion of said fastening means extending through said aperture, said bore, and said counterbore from said first abutment means;
    a second abutment means on said fastening member and disposed within said counterbore; and
    second biasing means interposed said shoulder and said second abutment means to bias said second abutment means away therefrom and, thereby, to bias said first abutment means into engagement with said support member to selectively inhibit unintentional loss of adjustment therebetween.

8. The rearview mirror assembly of claim 7 wherein said second abutment means comprises a washer removably interconnected with said fastening means.

9. The rearview mirror assembly of claim 7 wherein said support means further comprises:
   at least one recess in said swivel member adjacent said counterbore; and
   at least one boss on said second abutment means cooperating with said recess such as to limit the movement of said swivel member away from said partial spherical cavity.

10. The rearview mirror assembly of claim 1 wherein said first biasing means comprises a spring.

11. A rearview mirror assembly for a vehicle, said rearview assembly comprising:
   a casing having a longitudinal axis and an interior cavity;
   a convex face on said casing extending generally transversely relative to said longitudinal axis;
   support means adapted for rigid interconnection with said vehicle;
   a concave face on said support means selectively engageable with said convex face of said casing;
   at least one rib extending from said convex face;
   at least one slot in said concave face, said rib being selectively engageable with said slot in a first predetermined angular position of said casing relative to said support means to inhibit relative rotation therebetween, said longitudinal axis generally extending away from said vehicle in said first predetermined angular position;
   an opening in said convex face;
   a fastening member fixedly interconnected with said support means and extending therefrom through said opening in said convex face into said interior cavity of said casing;
   first biasing means disposed within said interior of said casing and mechanically interposed said casing and said fastening member, said first biasing means having a first end interconnected with said fastening member and a second end extending generally along said longitudinal axis therefrom and interconnected with a portion of said casing remote from said fastening member such that said first biasing means exerts a force generally along said longitudinal axis of said casing and further such that said first biasing means biases said at least one rib and said at least one slot into engagement in said first predetermined angular position such as to inhibit rotation therefrom but permit rotation therefrom in response to the application of a torque on said casing in excess of a predetermined torque level;
   at least two opposing bosses extending from said fastening member in a direction generally transverse to said longitudinal axis; and
   at least two slots extending from said opening and cooperating with said of least two opposing bosses when said casing is rotated from said first predetermined angular position in at least one angular direction therefrom, wherein said casing is pivotable in both angular directions from said first predetermined angular direction relative to said support means to second and third predetermined angular positions wherein said longitudinal axis is approximately parallel to said vehicle.

12. The rearview mirror assembly of claim 11 wherein said support means comprises:
   a support member adapted for interconnection with said vehicle;
   a partial spherical cavity inside of said support member;
   a swivel member partially pivotally fitted in said partial spherical cavity, said concave face being formed on said swivel member and said fastening member being interconnected with said swivel member; and
   fastening means to rotatably and movably interconnect said swivel member with said support member such as to permit adjustment of said rearview mirror assembly relative to said vehicle.

13. The rearview mirror assembly of claim 12 wherein said support means further comprises:
   a bore in said swivel member;
   a counterbore partially through said swivel member coaxial with said bore;
   a shoulder formed between said counterbore and said bore;
   an aperture in said support member and aligned with said bore;
   first abutment means on said fastening means and disposed adjacent said support member;
   an intermediate portion of said fastening means extending through said aperture, said bore, and said counterbore from said first abutment means;
   a second abutment means on said fastening member and disposed within said counterbore; and
   second biasing means interposed said shoulder and said second abutment means to bias said second abutment means away therefrom and, thereby, to bias said first abutment means into engagement with said support member to selectively inhibit unintentional loss of adjustment therebetween.

14. The rearview mirror assembly of claim 13 wherein said second abutment means comprises a washer removably interconnected with said fastening means.

15. The rearview mirror assembly of claim 13 wherein said support means further comprises:
   at least one recess in said swivel member adjacent said counterbore; and
   at least one boss on said second abutment means cooperating with said recess such as to limit the movement of said swivel member away from said partial spherical cavity.

16. A rearview mirror assembly for a vehicle, said rearview mirror assembly comprising:
   a casing having a longitudinal axis and an interior cavity;
   a convex face on said casing extending generally transversely relative to said longitudinal axis;
   support means adapted for rigid interconnection with said vehicle;
   a concave face on said support means selectively engageable with said convex face of said casing;
   at least one rib extending from said convex face;
   at least one slot in said concave face, said at least one rib being selectively engageable with said at least one slot in a first predetermined angular position of said casing relative to said support means to inhibit relative rotation therebetween, said longitudinal axis generally extending away from said vehicle in said first predetermined angular position;
   an opening in said convex face;

a fastening member fixedly interconnected with said support means and extending therefrom through said opening in said convex face into said interior cavity of said casing, said fastening member comprising a fork member having:
(a) a first branch;
(b) a second branch disposed parallel to said first branch;
(c) a cross-piece extending therebetween generally transverse to said longitudinal axis and transverse said at least one slot and said at least one rib; and
(d) two opposing bosses extending from said fastening member in a direction parallel to said slot and said rib;
first biasing means disposed within said interior of said casing and mechanically interposed said casing and said cross-piece of said fastening member, said first biasing means having a first end interconnected with said fastening member and a second end extending generally along said longitudinal axis therefrom and interconnected with a portion of said casing remote from said fastening member such that said first biasing means exerts a force generally along said longitudinal axis of said casing and further such that said first biasing means biases said at least one rib and said at least one slot into engagement in said first predetermined angular postion such as to inhibit rotation therefrom but permit rotation therefrom in response to the application of a torque on said casing in excess of a predetermined torque level; and
at least two slots extending from said opening and cooperating with said two opposing bosses when said casing is rotated from said first predetermined angular position in at least one angular direction therefrom, wherein said casing is pivotable in both angular directions from said first predetermined angular direction relative to said support means to second and third predetermined angular positions wherein said longitudinal axis is approximately parallel to said vehicle.

17. The rearview mirror assembly of claim 16 wherein said support means comprises:
a support member adapted for interconnection with said vehicle;
a partial spherical cavity inside of said support member;
a swivel member partially pivotally fitted in said partial spherical cavity, said concave face being formed on said swivel member and said fastening member being interconnected with said swivel member; and
fastening means to rotatably and movably interconnect said swivel member with said support member such as to permit adjustment of said rearview mirror assembly relative to said vehicle.

18. The rearview mirror assembly of claim 17 wherein said support means further comprises:
a bore in said swivel member;
a counterbore partialy through said swivel member coaxial with said bore;
a shoulder formed between said counterbore and said bore;
an aperture in said support member and aligned with said bore;
first abutment means on said fastening means and disposed adjacent said support member;
an intermediate portion of said fastening means extending through said aperture, said bore, and said counterbore from said first abutment means;
a second abutment means on said fastening member and disposed within said counterbore; and
second biasing means interposed said shoulder and said second abutment means to bias said second abutment means away therefrom and, thereby, to bias said first abutment means into engagement with said support member to selectively inhibit unintentional loss of adjustment therebetween.

19. The rearview mirror assembly of claim 18 wherein said second abutment means comprises a washer removably interconnected with said fastening means.

20. The rearview mirror assembly of claim 16 wherein said support means further comprises:
at least one recess in said swivel member adjacent said counterbore; and
at least one boss on said second abutment means cooperating with said at least one recess such as to limit the movement of said swivel member away from said partial spherical cavity.

* * * * *

UNITED STATES PATENT AND TRADEMARK OFFICE
CERTIFICATE OF CORRECTION

PATENT NO. : 4,523,736
DATED : June 18, 1985　　　　　　Sheet 1 of 3
INVENTOR(S) : Stephane Manzoni It is certified that error appears in the above-identified patent and that said Letters Patent is hereby corrected as shown below:

Column 1, line 25, after "view" insert ---- mirror ----.

Column 1, line 34, after "casing" insert ---- is ----.

Column 1, line 35, delete "there through" and insert ---- threrethrough ----.

Column 1, line 46, delete "to". Same line after "casing" insert ---- to ----.

Column 1, line 63, delete "of", second occurrence, and insert ---- and depicting ----.

Column 2, line 18, delete "housings 7,".

Column 2, line 22, delete "sprng" and insert ---- spring ----. Same line, delete "extends" and insert ---- extending ----.

Column 2, line 26, delete "cross piece" and insert ---- cross-piece ----.

Column 2, line 30, delete "by" and insert ---- such as ----.

Column 2, line 36, delete "lots" and insert ---- slots ----.

Column 2, line 37, after "12d" insert ---- of the branch 12a ----.

UNITED STATES PATENT AND TRADEMARK OFFICE
CERTIFICATE OF CORRECTION

PATENT NO. : 4,523,736
DATED : June 18, 1985
INVENTOR(S) : Stephane Manzoni

It is certified that error appears in the above-identified patent and that said Letters Patent is hereby corrected as shown below:

Column 2, line 41, after "positions" insert a comma ---- , ----.

Column 2, line 43, delete "retacted" and insert ---- retracted ----.

Column 2, line 47, after the numeral "3" insert a comma ---- , ----.

Column 2, line 58, delete "lever, 16" and insert ---- lever 16, ----.

Column 2, line 64, after "contact on" insert ---- one ----.

Column 2, line 65, after "annular" insert ---- bottom ----.

Column 2, line 66, delete "sides. The" and insert ---- sides, the ----.

Column 3, line 5, delete "The permits" and insert ---- This permits ----.

Column 3, line 10, delete "(such " and insert ---- such ----.

Column 3, line 11, delete "trucks)" and insert ---- trucks ----.

Column 3, line 29, delete "intermediate" and insert ---- intended to ----.

In The Claims

Column 4, line 23, delete "too" and insert ---- two ----.

UNITED STATES PATENT AND TRADEMARK OFFICE
CERTIFICATE OF CORRECTION

PATENT NO. : 4,523,736

DATED : June 18, 1985

INVENTOR(S) : Stephane Manzoni

Sheet 3 of 3

It is certified that error appears in the above-identified patent and that said Letters Patent is hereby corrected as shown below:

Column 7, line 10, after "transverse", second occurrence, insert ---- to ----.

Column 7, line 28, delete "postion" and insert ---- position ----.

Column 8, line 15, delete "partialy" and insert ---- partially ----.

In The Abstract

Line 3, after "face" insert ---- biased ----.

Line 8, delete "pivoting" and insert ---- pivotally ----.

Signed and Sealed this

Twenty-second Day of October 1985

[SEAL]

Attest:

Attesting Officer

DONALD J. QUIGG

Commissioner of Patents and
Trademarks—Designate